us009585022B2

(12) United States Patent
Selander et al.

(10) Patent No.: US 9,585,022 B2
(45) Date of Patent: Feb. 28, 2017

(54) PROFILE INTEGRATION MANAGEMENT

(71) Applicant: Telefonaktiebolaget L M Ericsson (publ), Stockholm (SE)

(72) Inventors: Göran Selander, Bromma (SE); Petter Arvidsson, Bromma (SE); Miguel Cardo Rodriguez, Madrid (ES); Mattias Eld, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/649,751

(22) PCT Filed: Nov. 19, 2013

(86) PCT No.: PCT/SE2013/051358
§ 371 (c)(1),
(2) Date: Jun. 4, 2015

(87) PCT Pub. No.: WO2015/076709
PCT Pub. Date: May 28, 2015

(65) Prior Publication Data
US 2015/0350916 A1    Dec. 3, 2015

(51) Int. Cl.
*H04W 12/10* (2009.01)
*H04W 4/00* (2009.01)
(Continued)

(52) U.S. Cl.
CPC ........... *H04W 12/10* (2013.01); *H04W 4/001* (2013.01); *H04W 8/18* (2013.01); *H04W 12/08* (2013.01); *H04W 8/20* (2013.01)

(58) Field of Classification Search
CPC ..... H04W 12/10; H04W 4/001; H04W 12/08; H04W 8/18; H04W 8/20
See application file for complete search history.

(56) References Cited

U.S. PATENT DOCUMENTS 9,191,388 B1 *  11/2015  Paczkowski ............ H04L 63/10
2013/0212637 A1 *  8/2013  Guccione ............. H04L 63/102
726/1
(Continued)

FOREIGN PATENT DOCUMENTS

KR    20130006258 A    1/2013
KR    20130049730 A    5/2013
(Continued)

OTHER PUBLICATIONS

PCT International Search Report for International application No. PCT/SE2013/051358, Sep. 25, 2014.
(Continued)

*Primary Examiner* — Joseph Dean, Jr.
(74) *Attorney, Agent, or Firm* — Baker Botts, LLP

(57) ABSTRACT

It is disclosed a method and trusted execution environments (TEE) of assigning a selected identifier to an application. A request is received to load or install, within or outside a profile domain, of an application with a selected identifier. It is checked that the selected identifier is not already stored in an application registry entry outside the profile registry 230, 302. If it is requested to load or install the application in the selected profile domain, the selected identifier is assigned to said application if the selected identifier is not already stored in an application entry of a profile domain registry associated with the selected profile domain. If it is requested to load or install the application outside any profile domain, the selected identifier is assigned to said application if the selected identifier is not already stored in an application entry of any of at least two profile domain registries.

8 Claims, 5 Drawing Sheets

(51) Int. Cl.
*H04W 12/08* (2009.01)
*H04W 8/18* (2009.01)
*H04W 8/20* (2009.01)

(56) References Cited

U.S. PATENT DOCUMENTS

2015/0281957 A1* 10/2015 Hartel .................. H04M 1/675
 455/411
2015/0289134 A1* 10/2015 Johnston .............. H04M 1/673
 380/270

FOREIGN PATENT DOCUMENTS

WO WO 2013/038236 3/2013
WO WO 2013/048084 4/2013

OTHER PUBLICATIONS

ETSI TS 103 383 V12.0.0; Technical Specification; Smart Cards; Embedded UICC; Requirements Specification; (Release 12), Feb. 2013.
"Secure Profile Provisioning Architecture for Embedded UICC" by Jaemin Park et al.; 2013 International Conference on Availability, Reliability and Security, 2013.
ETSI TS 102 222 v7.0.0; Technical Specification; Integrated Circuit Cards (ICC); Administrative commands for telecommunications applications (Release 7)—Aug. 2006.
ETSI TS 103 383 v12.0.0; Technical Specification; Smart Cards; Embedded UICC; Requirements Specification; (Release 12)—Feb. 2013.
Globalplatform; The Standard for Smart Card Infrastructure; Card Specification, Version 2.2—Mar. 2006.
Scptec(13)000072a Contributions to TS 103 384 v0.1.0; Technical Specification; Smart Cards; Embedded UICC; Physical, Logical and Electrical Characteristics (Release 12)—2013.
Extended European Search Report for Application No. / U.S. Pat. No. 13897730.1—1853/3072318 PCT/SE2013051358—Oct. 24, 2016.
EPO issued extended European Search Report for U.S. Appl. No. 13897730.1—1853/3072318 PCT/SE2013051358—Oct. 24, 2016.

* cited by examiner

PROFILE INTEGRATION MANAGEMENT

PRIORITY

This nonprovisional application is a U.S. National Stage Filing under 35 U.S.C. §371 of International Patent Application Serial No. PCT/SE2013/051358, filed Nov. 19, 2013, and entitled "PROFILE INTEGRATION MANAGEMENT."

TECHNICAL FIELD

This disclosure relates to profile integration management for trusted execution environments. In more particular, it relates a method and trusted execution environments of assigning a selected identifier to an application.

BACKGROUND

This invention relates to trusted execution environments (TEE) and universal integrated circuit cards (UICC). ETSI technical specification (TS) 103 383 provides requirements of the embedded UICC (eUICC). The purpose of this standard is to allow remote provisioning and management of operator "profiles" being the technical term for the programs and data which defines the subscription on a UICC having some subscriber identity module (SIM) applications. This is to enable an eUICC to be soldered to a device and never to be removed.

Use cases for UICC comprise "late binding" and "operator change" in machine-to-machine services. The former refers to the ability to define the mobile network operator (MNO) and subscription after the machine hosting the UICC has been deployed, i.e. after a SIM card has been inserted into a device. The latter refers to be able to change subscription for connectivity of the machine from one MNO to another, again without changing the SIM card.

A profile is defined to be a combination of a file structure, data and applications corresponding to the content of a current UICC. The eUICC architecture is built around the installation and management of profiles on the eUICC, which is functionally separated into two roles being the subscription manager data preparation (SM-DP) role, defining the profile and provisioning it to the eUICC, and the subscription manager secure routing (SM-SR) role, creating and deleting secure containers for the profile or SM-DP, and enabling and disabling profiles.

The SM-SR and SM-DP roles are assumed by actors in an eUICC ecosystem.

The eUICC addresses connectivity for machine-to-machine (M2M) services. In this context it is also beneficial that an M2M application can be hosted on the eUICC for performing a similar security service.

The eUICC is required to be able handle multiple profiles, i.e. subscriptions for cellular connectivity, and allow a controlled change from one profile to another. It is previously known that a logical eUICC architecture can have multiple instances of UICCs, each represented by a profile, and procedures for installing new profiles and enabling/disabling profiles. In such an architecture non-MNO applications, such as an M2M application, would be handled within a profile and thus a change of MNO/profile would disable the M2M application and require it to be re-installed and enabled in the new profile.

For this purpose, to allow change of profiles without affecting certain applications on the eUICC, we would like to allow applications to be installed on the eUICC but outside profiles.

There is hence a need for an improved architecture that enables installation of applications outside profiles.

SUMMARY

It is an object of embodiments of the invention to address at least some of the issues outlined above, and this object and others are achieved by a method and trusted execution environments for assigning a selected identifier to an application, according to the appended independent claims, and by the embodiments according to the dependent claims.

According to a first aspect, the invention provides a method for a TEE of assigning a selected identifier to an application, wherein the TEE comprises at least two profile domains for storing applications, and an extended application registry that comprises a profile registry that comprises at least two profile domain registries being adapted to store entries of applications stored in said at least two profile domains. The extended application registry is further adapted to store one or more entries external to said profile registry. The method comprises receiving a request to load or install, in a selected profile domain or external to any profile domain of the TEE, an application with a selected identifier. The method further comprises checking if the selected identifier is stored in an application registry entry that is external to the profile registry.

If the selected identifier is not stored in an application entry that is external to the profile registry and if the request is a request to load or install the application in the selected profile domain, the method comprises checking if the selected identifier is stored in an application entry that belongs to a profile domain registry adapted to register applications stored in the selected profile domain, and assigning the selected identifier to said application if it is not stored.

If the selected identifier is not stored in an application entry that is external to the profile registry and if the request is a request to load or install the application external to any profile domain of the TEE, the method comprises checking if the selected identifier is stored in an application entry that belongs to any of said at least two profile domain registries, and assigning 68 the selected identifier to said application if it is not stored.

According to a second aspect, the invention provides a TEE adapted to assign a selected identifier to an application, and comprises at least two profile domains for storing applications, and an extended application registry that comprises a profile registry including at least two profile domain registries adapted to store entries of applications stored in said at least two profile domains, and wherein the extended application registry is further adapted to store one or more entries external to said profile registry. The TEE comprises a processor, and a memory storing a computer program comprising computer program code. When this computer program code is run in the processor, it causes the TEE to receive a request to load or install, in a selected profile domain or external to any profile domain of the TEE, an application with a selected identifier, and to check if the selected identifier is stored in an application registry entry that is external to the profile registry.

If the selected identifier is not stored in an application entry that is external to the profile registry, and if the request is a request to load or install the application in the selected profile domain, the computer program code causes the TEE to check if the selected identifier is stored in an application entry that belongs to a profile domain registry adapted to register applications stored in the selected profile domain, and to assign the selected identifier to said application if it is not stored.

If the selected identifier is not stored in an application entry that is external to the profile registry, and if the request is a request to load or install the application external to any profile domain of the TEE, the computer program code causes the TEE to check if the selected identifier is stored in an application entry that belongs to any of said at least two profile domain registries, and to assign the selected identifier to said application if it is not stored.

It is an advantage with embodiments of the invention that conflict free handling of profile domain-external applications is provided.

It is also an advantage that the extended GlobalPlatform registry comprises a subset that maps to the GlobalPlatform registry, for the ease of integration in existing GlobalPlatform environment implementations.

BRIEF DESCRIPTION OF THE DRAWINGS

Embodiments will now be described in more detail, and with reference to the accompanying drawings, in which.

DETAILED DESCRIPTION

In the following description, different embodiments of the invention will be described in more detail, with reference to accompanying drawings. For the purpose of explanation and not limitation, specific details are set forth, such as particular examples and techniques in order to provide a thorough understanding.

As mentioned above there is hence a need for an improved architecture that enables installation of applications outside profiles. One problem with this is how to handle application identifiers or so called application identities (AIDs). Each application has a unique application identifier recorded in a registry. This is of interest because 1) certain internal privileges are defined in terms of application identifiers, and 2) the application identifier is used to select which application to communicate with on the eUICC.

Since applications in different profiles may be different, the set of used application identifiers on the eUICC depend on current enabled profile. Which application identifiers that will be used on the eUICC in the future cannot be determined since a new profile, including its applications, is defined at the time of change. Hence there is a problem that an application identifier of an existing profile-external M2M application, may potentially coincide with that of an application of a future profile. This would cause a conflict when changing to a new profile where there is an application with the same application identifier.

Figure 1A:
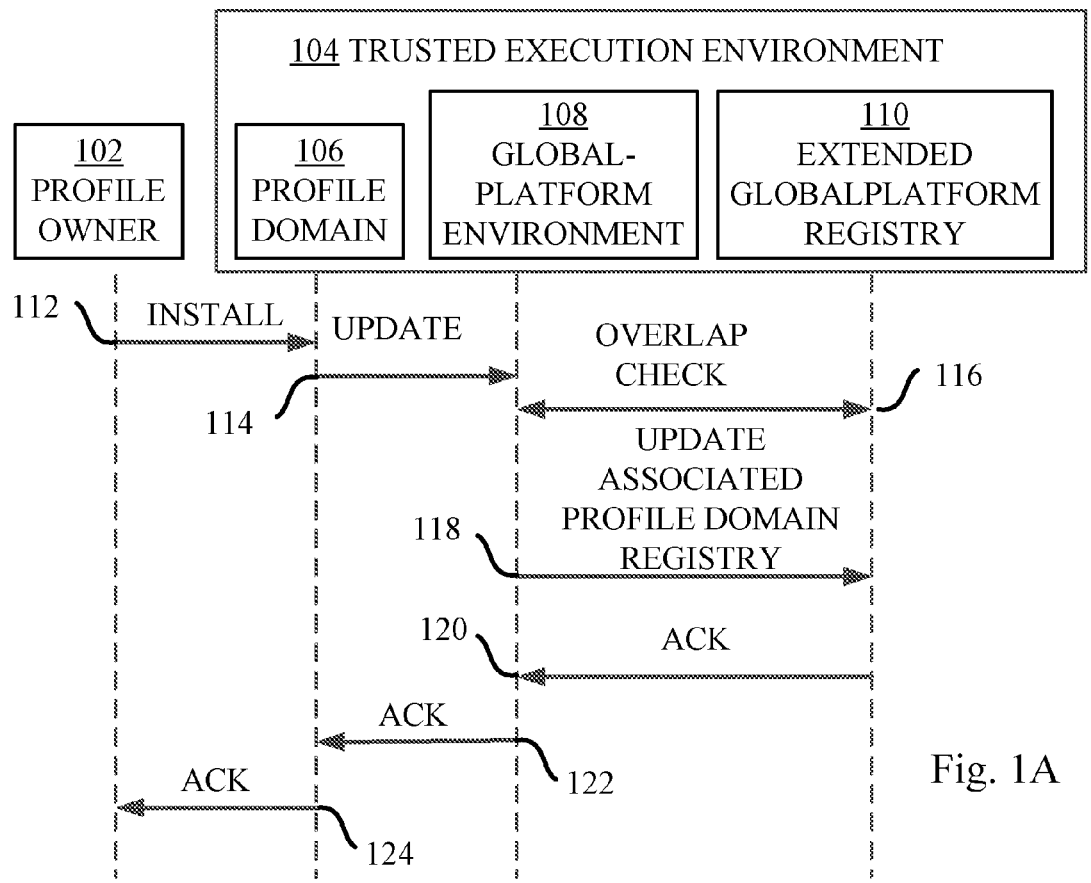
FIGS. 1A and 1B present signalling diagrams related to embodiments of the present invention.
Figure 1B:
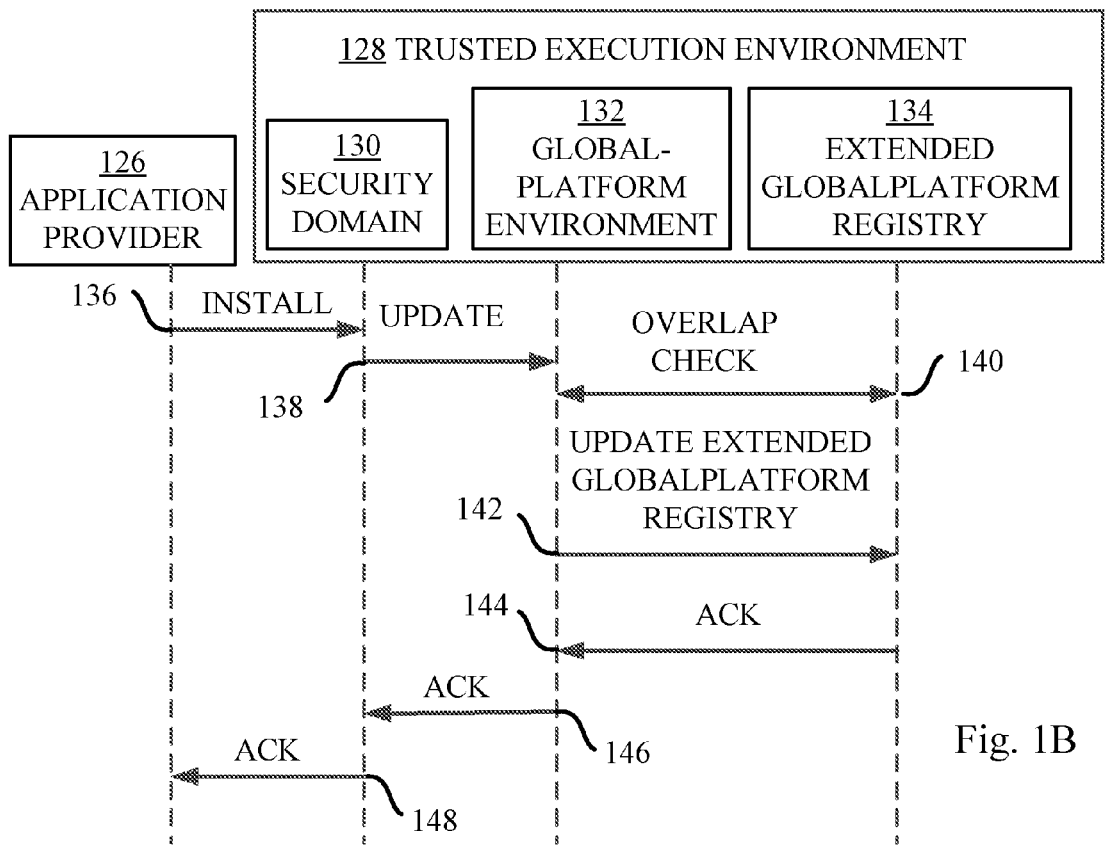

FIGS. 1A and 1B present signalling diagrams related to embodiments of the present invention.

In FIG. 1A signalling is performed between a profile owner 102 and a trusted execution environment (TEE) 104, and a profile domain 106, a GlobalPlatform environment 108, and an extended GlobalPlatform registry 110, being one example of an extended application registry, all comprised within said TEE 104.

Suppose the profile owner 102 wishes to install or load an application into a profile domain 106 of the TEE 104, and sends an install command 112 to load or install an application to profile domain of the said TEE 104. Having received the command the profile domain 106 sends an update 114 command to the GlobalPlatform environment 108 of the TEE 104. The GlobalPlatform environment 108 now has to ensure to that the application can be installed with an identifier that is not already used in the extended GlobalPlatform registry. If an identifier that is selected for the application is already used, either an immediate or a potential overlap of identifiers would occur upon using said selected identifier for the application to be loaded or installed. Any overlap of identifiers shall strongly be avoided since an overlap would sooner or later result in for instance a collision of called or activated applications.

The GlobalPlatform environment 108 therefore performs an overlap check 116 in the extended GlobalPlatform registry 108. This check comprises all application entries that are stored external to a profile registry as well as application entries in a profile domain registry that is adapted to store identifiers of applications of the profile domain 106.

Having performed an overlap check, and in case the identifier is not used in the extended GlobalPlatform registry as an application identifier, said identifier can hence be used for a profile domain registry that is associated with the application to be installed or loaded in the profile domain 106 is updated 118. Upon updating the profile domain registry of the TEE 104 an acknowledgement 120 is sent to the GlobalPlatform environment 108 that forwards the acknowledgement 122 to the profile domain 106. Then the profile domain 106 sends an acknowledgement 124 to the profile owner, about that the installation command sent in 112 is responded to affirmative.

In FIG. 1B signalling is performed between an application provider 126 and a trusted execution environment (TEE) 128, and a security domain 130, a GlobalPlatform environment 132, and an extended GlobalPlatform registry 134, being one example of an extended application registry, all comprised within said TEE 128.

When the application provider 126 wishes to install or load an application into a security domain 130 of the TEE 128, the application provider 126 sends an install command 136 to load or install an application to the security domain of the said TEE 128. Having received the command the security domain 130 sends an update 138 command to the GlobalPlatform environment 132. The GlobalPlatform environment 132 now has to ensure to that the application can be installed with an identifier that is not already used in the extended GlobalPlatform registry. If an identifier that is selected for the application is already used, either an immediate or a potential overlap of identifiers would occur upon using said selected identifier for the application to be loaded or installed. Any overlap of identifiers shall strongly be avoided since an overlap would sooner or later result in for instance a collision of called or activated applications.

The GlobalPlatform environment 132 therefore performs an overlap check 140 in the extended GlobalPlatform registry 134. Since the command is to install the application in a security domain 130, i.e. external to a profile domain, this check 140 comprises information about identifiers of all applications loaded or installed in the TEE 128.

Having performed the overlap check 140, and in case the identifier is not used in the extended GlobalPlatform registry as an application identifier, said identifier can hence be used to store 142 the identifier for the application external to any profile registry. Upon this updating 142 of the extended GlobalPlatform registry of the TEE 128, an acknowledgement 144 is sent to the GlobalPlatform environment 132 that forwards an acknowledgement 146 to the security domain 130. Then the security domain 130 sends an acknowledgement 148 to the application provider, about that the installation command sent in 136 is responded to affirmative.

Figure 2:
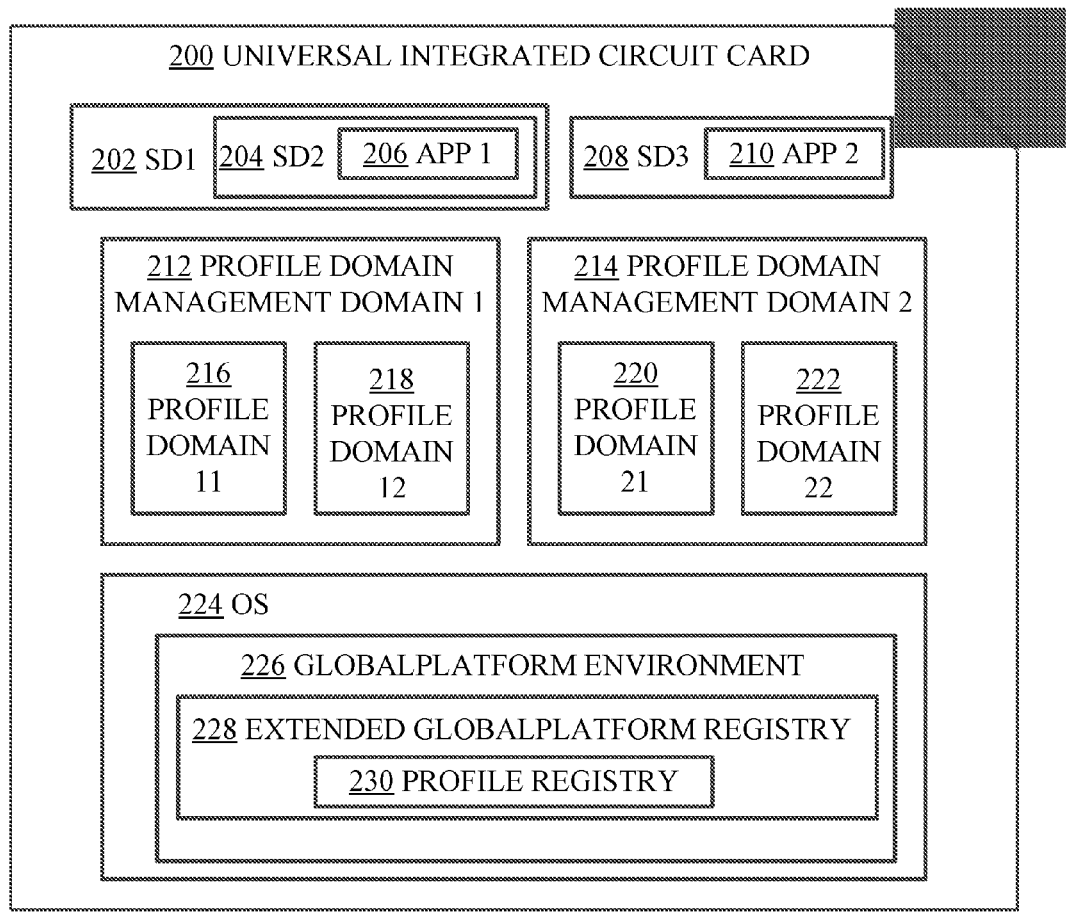
FIGS. 2 and 3 schematically present a universal integrated circuit card and an extended GlobalPlatform registry, respectively, of embodiments of the invention.

FIG. 2 schematically presents a universal integrated circuit card (UICC) 200 being an implementation example of a trusted execution environment (TEE).

In some embodiment the UICC 200 comprises security domains (SD), management domains 212, 214 of profile domains, so called, profile domain management domains, as well as an operative system (OS) 224. Security domain (SD) 1, 202 comprises SD 2, 204 that encompasses an application (APP) 1, 206. In another SD 3, 208 of the UICC, an application (APP) 2, 210 is comprised.

Herein, two profile domain management domains are comprised in the TEE 200. Profile domain management domain 1, 212, comprises profile domain 11, 216 and profile domain 12, 218. Profile domain management domain 2, 214 comprises profile domain 21, 220 and profile domain 22, 222. The profile domain management domains can naturally comprise more than two profile domains.

In addition, the OS 224 of the UICC 200 comprises a GlobalPlatform environment 226 that comprises an extended GlobalPlatform registry 228. The extended GlobalPlatform registry comprises herein a profile registry 230.

Figure 3:
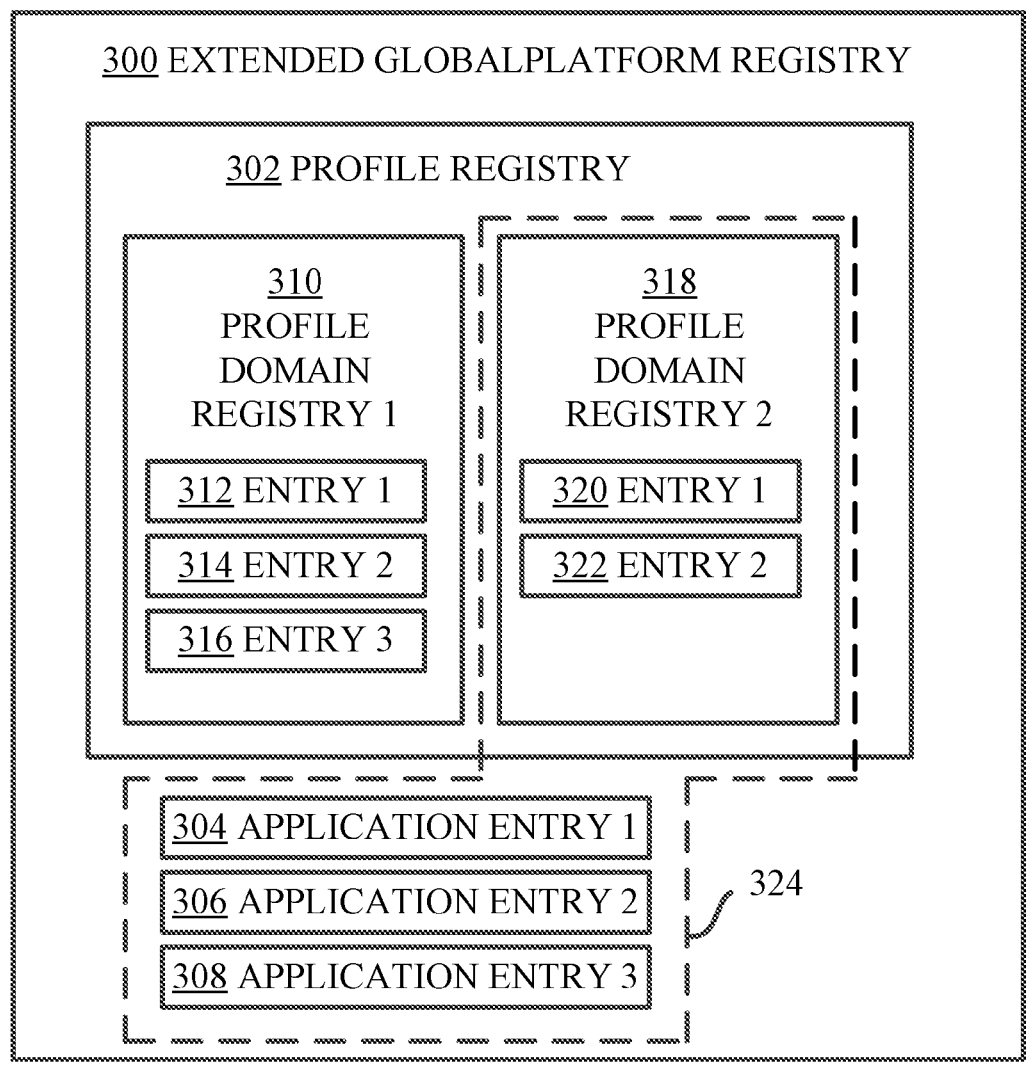

FIG. 3 presents an extended GlobalPlatform registry 300, according to some embodiments of the invention. This is an extension of the registry known as the GlobalPlatform registry.

The extended GlobalPlatform registry 300 comprises a profile registry 302 and regular entries 304, 306, 308. This profile registry is adapted to comprise at least two profile domain registries. Herein this is illustrated with the presence of profile domain registry 1, 310 and profile domain registry 2, 318. Each profile domain registry is adapted to store entries of loaded or installed applications. In this example embodiment of FIG. 3, profile domain registry 1, 310 comprises entry 2, 312, entry 2, 314 and entry 3, 316. Profile domain registry 2, 318 comprises entry 1, 320, and entry 2, 322.

The TEE 300 also comprises application entries that are external to the profile registry 302. In this illustrative example, application entry 1, 304, application entry 2, 306 and application entry 3, 308 are external to the profile registry. Since TEEs and UICCs of today do not comprise profile registries, these application entries 304, 306, 308, being external to the profile registry, can be considered to be regular or ordinary entries or applications.

It should be mentioned that applications that have identifiers external to the profile registry are available to all profile owners, whereas the applications having identifiers within each profile domain are only available from within said profile domain registry.

In TEE 300, it is also indicated what a GlobalPlatform registry can comprise. Prior to this invention, all application entries belonged to one entity, the GlobalPlatform registry. Introducing a profile registry, application entries that are either internal or external to this profile registry are introduced.

Only one profile can be enabled at each point in time, which means that applications having identifiers within only one profile domain registry can be selected from at each point in time. This mean that application entries in differing profile domain registries can have the same identifier.

However, application entries external to the profile registry are always selectable, since they will be comprises in any enabled set of application entries, corresponding to the GlobalPlatform registry. For, this reason, application identifiers that are external will always have to be considered when attempting to load or install an application into a TEE.

Figure 4:
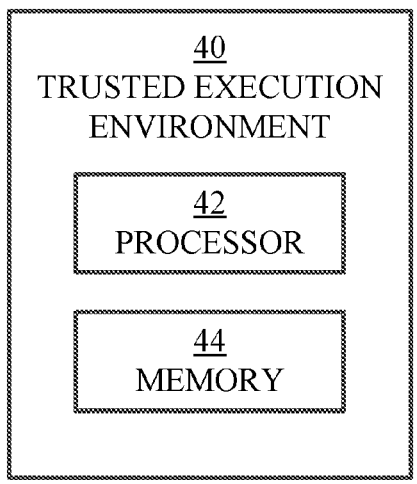
FIGS. 4 and 5 schematically present trusted execution environments of embodiments of the invention.

FIG. 4 schematically presents a TEE 40 according embodiments of the present invention. The TEE 40 is adapted to assign a selected identifier to an application, and comprises at least two profile domains for storing applications, and an extended application registry 108, 228, 300, which comprises a profile registry 230, 302 including at least two profile domain registries 110, 310, 318 adapted to store entries 312, 314, 316, 320, 322 of applications stored in said at least two profile domains, and wherein the extended application registry 108, 228, 300 is further adapted to store one or more entries 304, 306, 308 external to said profile registry 302, the TEE comprises a processor 42, and a memory 44 storing a computer program comprising computer program code. When this computer program code is run in the processor, it causes the TEE to receive 62, 114 a request to load or install, in a selected profile domain or external to any profile domain of the TEE, an application with a selected identifier, and to check 64, 116 if the selected identifier is stored in an application registry entry 304, 306, 308 that is external to the profile registry 230, 302.

If the selected identifier is not stored in an application entry 304, 306, 308 that is external to the profile registry 230, 302, and if the request is a request to load or install the application in the selected profile domain, the computer program code causes the TEE to check 66, 116 if the selected identifier is stored in an application entry 312, 314, 316; 320, 322 belonging to a profile domain registry adapted to register applications stored in the selected profile domain, and to assign 68, 118 the selected identifier to said application if it is not stored.

If the selected identifier is not stored in an application entry 304, 306, 308 that is external to the profile registry 230, 302, and if the request is a request to load or install the application external to any profile domain of the TEE, the computer program code causes the TEE to check 67, 116 if the selected identifier is stored in an application entry 312, 314, 316, 320, 322 belonging to any of said at least two profile domain registries, and to assign 68, 118 the selected identifier to said application if it is not stored.

The computer program code running in the processor may cause the TEE to store the selected identifier in an application entry that is external to the profile registry 230, 302 of the extended application registry, if the request is a request to load or install the application external to any profile domain of the TEE.

The computer program code running in the processor may cause the TEE to store the selected identifier in an application entry belonging to the profile domain registry 310; 318 that is adapted to register applications stored in the selected profile domain, if the request is a request to load or install the application in the selected profile domain.

The TEE 40 may comprise a universal integrated circuit card (UICC) 200.

Figure 5:
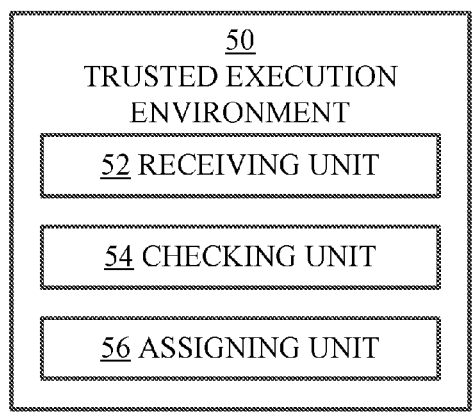

FIG. 5 schematically illustrates a TEE 50 of embodiments of the invention. The TEE 50 is arranged to assign a selected identifier to an application. The TEE 50 comprises at least two profile domains 216, 218, 220, 222 for storing applications. The TEE 50 also comprises an extended application registry 108, 228, 300, which comprises a profile registry 230, 302 that comprises at least two profile domain registries 310, 318 which are adapted to store entries of applications stored in said at least two profile domains. The extended application registry 108, 228, 300 in the TEE 50 is further adapted to store one or more application entries 304, 306, 308 external to said profile registry 230, 302. The TEE 50 also comprises a receiving unit 52 that is adapted to receive 62, 114 a request to load or install, in a selected profile domain or external to any profile domain of the TEE, an application with a selected identifier. The TEE further comprises a checking unit 54 that is adapted to check 64, 116 if the selected identifier is stored in an application registry entry 304, 306, 308 that is external to the profile registry 230, 302.

If the selected identifier is not stored in an application entry 304, 306, 308 that is external to the profile registry 230, 302, and if the request is a request to load or install the application in the selected profile domain, the checking unit 54 is further adapted to check 66, 116 if the selected identifier is stored in an application entry 312, 314, 316; 320, 322 belonging to a profile domain registry adapted to register applications stored in the selected profile domain.

If the selected identifier is not stored in an application entry 304, 306, 308 that is external to the profile registry 230, 302, and if the request is a request to load or install the application external to any profile domain of the TEE, the checking unit 54 is further adapted to check 67, 116 if the selected identifier is stored in an application entry 312, 314, 316, 320, 322 that belongs to any of said at least two profile domain registries.

In addition, the TEE comprises an assigning unit 56 that is adapted to assign 68 the selected identifier to said application if the selector identifier is not stored in an application entry 312, 314, 316; 320, 322 that belongs to a profile domain registry adapted to register applications stored in the selected profile domain, if the request is a request to load or install the application in the selected profile domain.

The assigning unit 56 is also adapted to assign 68 the selected identifier to said application if the selected identifier is stored in an application entry 312, 314, 316, 320, 322 that belongs to any of said at least two profile domain registries, if the request is a request to load or install the application external to any profile domain of the TEE.

Figure 6:
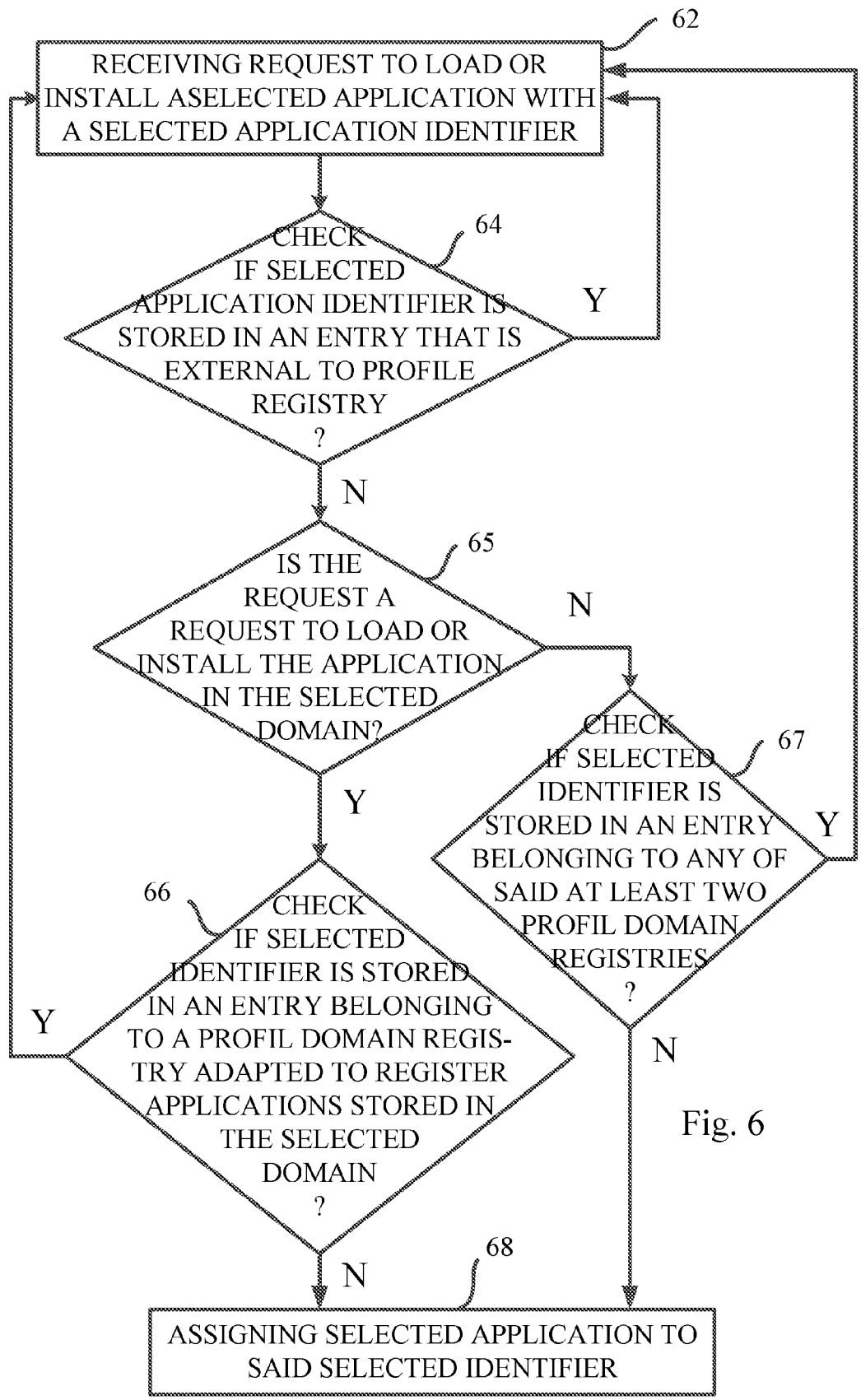
FIG. 6 presents a flowchart of a method of embodiments of the invention.

FIG. 6 presents a flowchart of a method according to some embodiments of the invention. The method is a method for a TEE 40, 50 of assigning a selected identifier to an application, wherein the TEE comprises at least two profile domains for storing applications, and an extended application registry 108, 228, 300, which comprises a profile registry 230, 302 that comprises at least two profile domain registries 110, 310, 318 being adapted to store entries 312, 314, 316, 320, 322 of applications stored in said at least two profile domains. The extended application registry 108, 228, 300 is further adapted to store one or more entries 304, 306, 308 external to said profile registry 302. The method comprises receiving 62, 114 a request to load or install, in a selected profile domain or external to any profile domain of the TEE, an application with a selected identifier. The method further comprises checking 64, 116 if the selected identifier is stored in an application registry entry 304, 306, 308 that is external to the profile registry 230, 302.

If the selected identifier is not stored in an application entry 304, 306, 308 that is external to the profile registry 230, 302 and if the request is a request to load or install the application in the selected profile domain, the method comprises checking 66, 116 if the selected identifier is stored in an application entry 312, 314, 316; 320, 322 that belongs to a profile domain registry adapted to register applications stored in the selected profile domain, and assigning 68 the selected identifier to said application if it is not stored.

If the selected identifier is not stored in an application entry 304, 306, 308 that is external to the profile registry 230, 302 and if the request is a request to load or install the application external to any profile domain of the TEE, the method comprises checking 67, 116 if the selected identifier is stored in an application entry 312, 314, 316, 320, 322 that belongs to any of said at least two profile domain registries, and assigning 68 the selected identifier to said application if it is not stored.

The present invention has the following advantages:

Embodiments of the invention provide conflict free handling of profile domain-external applications.

It is also advantageous that the extended GlobalPlatform registry comprises a subset that maps to the GlobalPlatform registry, for the ease of integration in existing GlobalPlatform environment implementations, such as OPEN implementations.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

AID—application identity
eUICC—embedded UICC
M2M—machine to machine
MNO—mobile network operator
SM-DP—subscription manager data preparation
SM-SR—subscription manager secure routing
OS—operation system
SD—security domain
SIM—subscriber identity module
TEE—trusted execution environment
UICC—universal integrated circuit card

The invention claimed is:

1. A method in a trusted execution environment (TEE) of assigning a selected identifier to an application, wherein the TEE includes at least two profile domains for storing applications, and an extended application registry, which includes a profile registry including at least two profile domain registries adapted to store entries of applications stored in said at least two profile domains, and wherein the extended application registry is further adapted to store one or more entries external to said profile registry, the method comprising:

receiving a request to load or install, in a selected profile domain or external to any profile domain of the TEE, an application with a selected identifier;

when the received request comprises a request to load or install the application in the selected profile domain, and when the selected identifier is not stored in an application entry belonging to a profile domain registry adapted to register applications stored in the selected profile domain, assigning the selected identifier to said application; and when the received request comprises a request to load or install the application external to any profile domain of the TEE, and when the selected identifier is not stored in an application entry belonging to any of said at least two profile domain registries, assigning the selected identifier to said application.

2. The method according to claim 1, further comprising storing the selected identifier in an application entry that is external to the profile registry of the extended application registry when the received request comprises a request to load or install the application external to any profile domain of the TEE.

3. The method according to claim 1, further comprising storing the selected identifier in an application entry belonging to the profile domain registry adapted to register applications stored in the selected profile domain when the received request comprises a request to load or install the application in the selected profile domain.

4. A computer program product for operating in a trusted execution environment (TEE) adapted to assign a selected identifier to an application, the TEE including at least two profile domains for storing applications, and an extended application registry, which includes a profile registry including at least two profile domain registries adapted to store entries of applications stored in said at least two profile domains, and wherein the extended application registry is further adapted to store one or more entries external to said profile registry, the computer program product comprising instructions stored on non-transient computer readable media, which, when executed by a processor, are operable to:
receive a request to load or install, in a selected profile domain or external to any profile domain of the TEE, an application with a selected identifier,
when the received request is comprises a request to load or install the application in the selected profile domain, and when the selected identifier is not stored in an application entry belonging to a profile domain registry adapted to register applications stored in the selected profile domain, assign the selected identifier to said application; and
when the received request comprises a request to load or install the application external to any profile domain of the TEE, and when the selected identifier is not stored in an application entry belonging to any of said at least two profile domain registries, assign the selected identifier to said application.

5. The computer program product according to claim 4, wherein the instructions, when executed by the processor, are further operable to store the selected identifier in an application entry that is external to the profile registry of the extended application registry when the received request comprises a request to load or install the application external to any profile domain of the TEE.

6. The computer program product according to claim 4, wherein the instructions, when executed by the processor, are further operable to store the selected identifier in an application entry belonging to the profile domain registry adapted to register applications stored in the selected profile domain when the received request comprises a request to load or install the application in the selected profile domain.

7. The computer program product according to claim 4, wherein the TEE comprises a universal integrated circuit card, UICC.

8. A trusted execution environment (TEE) operable to assign a selected identifier to an application, the TEE comprising:
at least two profile domains for storing applications;
an extended application registry, which comprises a profile registry including at least two profile domain registries adapted to store entries of applications stored in said at least two profile domains, wherein the extended application registry is further adapted to store one or more application entries external to said profile registry;
a receiving unit adapted to receive a request to load or install, in a selected profile domain or external to any profile domain of the TEE, an application with a selected identifier;
a checking unit adapted to check if the selected identifier is stored in an application registry entry that is external to the profile registry;
when the selected identifier is not stored in an application entry that is external to the profile registry, and when the request is a request to load or install the application in the selected profile domain, the checking unit is further adapted to check if the selected identifier is stored in an application entry belonging to a profile domain registry adapted to register applications stored in the selected profile domain, and
when the selected identifier is not stored in an application entry that is external to the profile registry, and when the request is a request to load or install the application external to any profile domain of the TEE, the checking unit is further adapted to check if the selected identifier is stored in an application entry belonging to any of said at least two profile domain registries,
an assigning unit adapted to assign the selected identifier to said application when the selector identifier is not stored in an application entry belonging to a profile domain registry adapted to register applications stored in the selected profile domain, and when the request is a request to load or install the application in the selected profile domain, or when the selected identifier is stored in an application entry belonging to any of said at least two profile domain registries, and when the request is a request to load or install the application external to any profile domain of the TEE.

* * * * *